April 5, 1960  K. G. ÅHLÉN  2,931,472
HYDRAULIC TRANSMISSION
Filed Oct. 3, 1957  5 Sheets-Sheet 1

April 5, 1960 K. G. ÅHLÉN 2,931,472
HYDRAULIC TRANSMISSION
Filed Oct. 3, 1957 5 Sheets-Sheet 4

INVENTOR.
Karl Gustav Åhlén
BY
his Attorney

United States Patent Office 2,931,472
Patented Apr. 5, 1960

2,931,472
HYDRAULIC TRANSMISSION

Karl Gustav Åhlén, Stockholm, Sweden, assignor to Svenska Rotor Maskiner Aktiebolag, Nacka, Sweden, a corporation of Sweden Application October 3, 1957, Serial No. 688,003

Claims priority, application Sweden August 16, 1957

19 Claims. (Cl. 192—3.2)

This invention relates to a hydraulic transmission which is particularly well adapted for rail vehicles provided with several shafts driven by a common engine but via separate transmissions. Due to the fact that the diameters of the wheels on different drive shafts may vary somewhat, the problem arises that different drive shafts must have different speeds. When these shafts are driven by a common engine but via different transmissions, some possibility of slipping must exist within each individual transmission between the engine and the shaft in order to limit the maximum torque through the transmission and to ensure distribution of the drive torque on the various shafts.

A particularly suitable transmission, where rapid and smooth acceleration in a rail vehicle is concerned, consists of a hydrodynamic transmission which by means of suitable devices previously known can produce a very great starting torque and which has a very smooth transition free from jerks between the various gearing stages.

However with a view to the fuel economy direct drive might be preferable by means of a mechanical direct coupling arranged between the pump member and the turbine member of the torque converter, when the speed ratio between the turbine member and the pump member is so high that no torque multiplication can be obtained by means of the torque converter.

At direct drive, however, the possibility of slipping existing at the power transmission through the hydrodynamic torque converter is eliminated. In view thereof a further element has to be introduced in the transmission which makes it possible to obtain the slipping required for the maximum torque limitation at direct drive also.

This problem has been solved in the present invention by providing the transmission with a hydrostatic coupling in series with the hydrodynamic torque converter and its direct coupling. In addition to its characteristic of allowing slipping the hydrostatic coupling will also lower vibrations at all speeds.

A hydrostatic coupling consists of one or several members made as pumps which, when the supplied torque is smaller than the maximum transmittable torque, will pump that much fluid only that corresponds to the leak losses. Both members of the coupling will hereby rotate at almost identical speeds. When on the other hand the supplied torque is greater than the maximum transmittable torque, the pumps will circulate fluid in the coupling via valves loaded with a determined pressure, whereby the driven member of the coupling will rotate at a lower rate than the driving member.

By applying a hydrostatic coupling in this manner also other advantages are obtained in addition to the maximum torque limitation. Thus the torque peaks which otherwise will propagate through the entire transmission are equalized by this coupling. In this way it is possible to dimension the direct coupling for a much smaller torque and to calculate it as a "holding clutch" only, making it possible to reduce the diameter of the coupling discs and as a consequence also the ventilation losses during hydraulic drive. In addition the risk for overloading the shafts of the transmission with shaft break as a result will be reduced. Likewise overloading of the drive connection between the engine and the transmission is prevented. Further the advantage is obtained as compared with previously known hydrodynamic torque converters that the parts of the transmission rotating rigidly with the engine shaft are reduced considerably due to the fact that the rotating housing of the torque converter no longer is included in these parts which reduces the problem of changing the critical speed of the engine. Furthermore the hydrostatic coupling serves as vibration damper at said critical speed.

A hydrostatic coupling intended to be applied on a rail vehicle or the like must, however, be designed in a particular manner in order to operate satisfactorily at the high speeds existing as compared with ship transmissions where it has previously had its greatest range of application as a vibration dampening element between a low-speed diesel engine and the propeller shaft.

A hydraulic transmission according to the present invention consists of a hydrodynamic torque converter, including in a working chamber a closed circuit with a number of blade rings arranged on pump, reaction and turbine members and provided with direct coupling between the pump and turbine members and a hydrostatic coupling arranged in series therewith.

According to the invention the hydrostatic coupling is further in open connection with the working chamber of the torque converter, whereby the coupling constantly is filled with hydraulic fluid from the hydrodynamic torque converter.

In order to obtain a compact design the pump member of the torque converter is rigidly connected to a housing filled with fluid in which a number of gears are planetarily journalled. These gears are arranged in pairs in recesses of the housing and serve as gear pumps to pump fluid from the housing filled with fluid to separate pressure chambers. The drive of the gear pumps is obtained thereby that one gear of each pump is cooperating with a gear arranged on the primary shaft.

The two pump gears included in the pump are either equally dimensioned and arranged at different radial distances from the transmission shaft, the difference in radius being of the same size as the depth of the teeth or arranged at equally great radial distances from the transmission shaft and differently dimensioned, the difference in radius being of the same size as the depth of the teeth. In this way the effect of the centrifugal force will be approximately equal on the two gears.

Furthermore each gear pump is provided with a pressure chamber arranged radially outside the pump and having a great peripheral extension, so that the hydraulic pressure acting on each pump gear will have a resultant which is directed approximately counter the centrifugal force acting on the gear. Due to the above mentioned dimensioning of the pump gears and their radial distances the difference between the centrifugal force and the hydraulic pressure will be equal also on both pump gears and thus the bearing pressure also.

In order to determine the maximum torque transmittable by the coupling, each pump is further provided with a valve arranged in a circulation duct between its pressure side and its suction side. It is possible to provide each such valve with a spring that will press the valve body towards its seat. In order to obtain as synchronous a start as possible of the various gear pumps it is possible to adjust these springs individually.

Different characteristics of the coupling may be obtained by making this valve in different ways. If the valve body is placed in such a way that it moves radially outwards towards its seat for sealing, the forces of the valve spring and the centrifugal force are added together, resulting in a coupling which is able to maximally transmit greater torque at high speeds than at low speeds which may be of particular advantage if the driving arrangement for the transmission has a low critical speed that has to be passed during drive. The valve spring may possibly be altogether dispensed with in this design so that the valve will be controlled by means of the centrifugal force only.

If, on the other hand, the valve body is moved radially inwards toward its seat for sealing, the centrifugal force will be subtracted from the force of the valve spring, whereby a coupling is obtained which is able to maximally transmit greater torque at low speeds than at high speeds, resulting in that the transmitted power can be maintained approximately constant.

By varying the rigidity of the valve spring and the mass of the valve body it is possible to adjust the coupling characteristic to desired incline.

If the maximum transmittable torque is to be maintained constant irrespective of the speed, the valve body should be movable in parallel only to the shaft whereby the effect of the centrifugal force on same is neutralized.

A considerable portion of the leakage in a gear pump arises between the plane sides of the gears and the housing surfaces contacting these sides. In the present invention each gear pump is therefore provided with sealing plates, axially pressed-in against the gears. This pressing-in can be carried out either by conducting pressure fluid from the pump pressure side through a duct to those sides of the sealing plates that are turned away from the pump or by applying pressure springs in such a way that they actuate those sides of the sealing plates that are turned away from the pump. Sometimes a combination of these two alternatives can be used.

In order to make operation possible in both directions, particularly accomplishing a braking effect with the engine in vehicle drive, by means of the hydrostatic coupling certain gear pumps are further arranged to supply fluid to their pressure chambers at one direction of rotation of the gear arranged on the primary shaft relative the housing filled with fluid, and other gear pumps to supply fluid to their pressure chambers at opposite direction of rotation of said gear relative above mentioned housing.

In order to simplify the bearing and sealing problems it is furthermore advantageous to arrange the pump gear shafts non-turnable in the housing and to journal the pump gears rotationally on their shafts, preferably by means of needle bearings.

A number of suitable embodiments of the invention are shown on the accompanying drawings, in which.

In the following detailed description the same reference characters have been used for identical parts as those in my copending application Serial No. 688,002, filed October 3, 1957, concerning a hydrostatic coupling.

Figure 1:
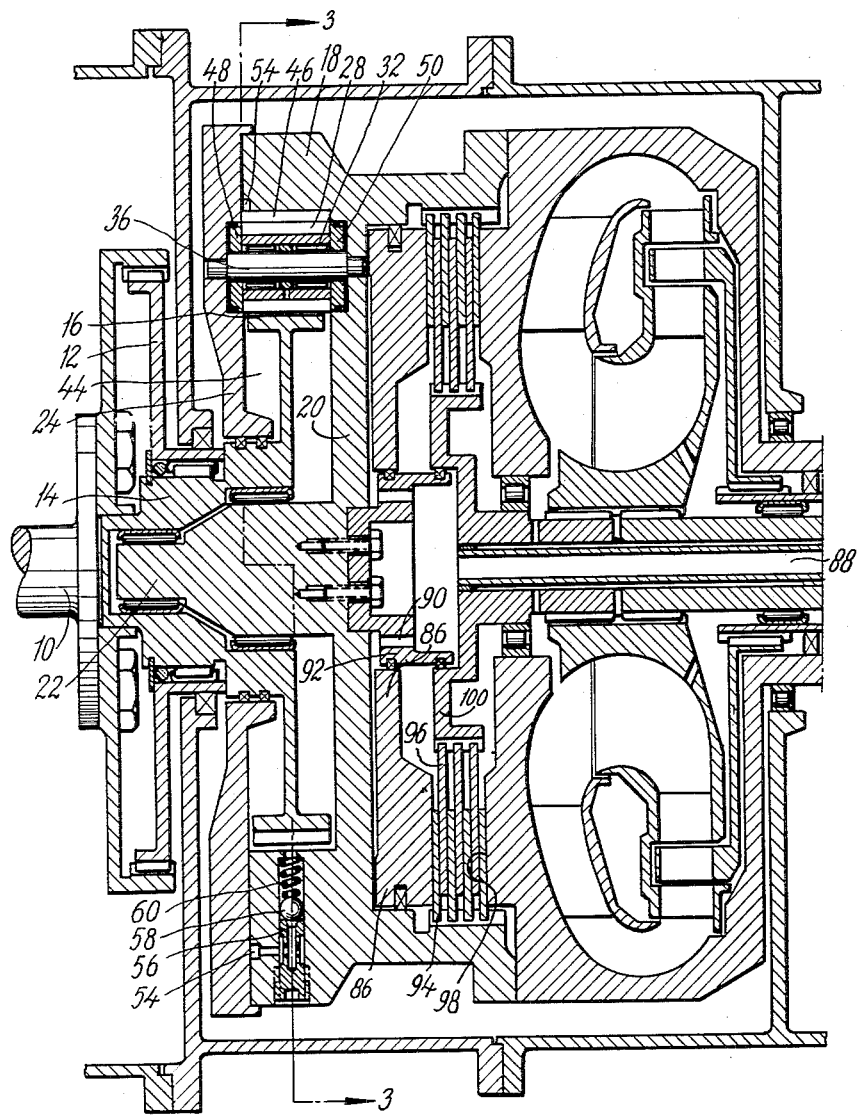
Fig. 1 shows a longitudinal section through one embodiment of the hydraulic transmission along the line 1—1 in Fig. 3.
Figure 2:
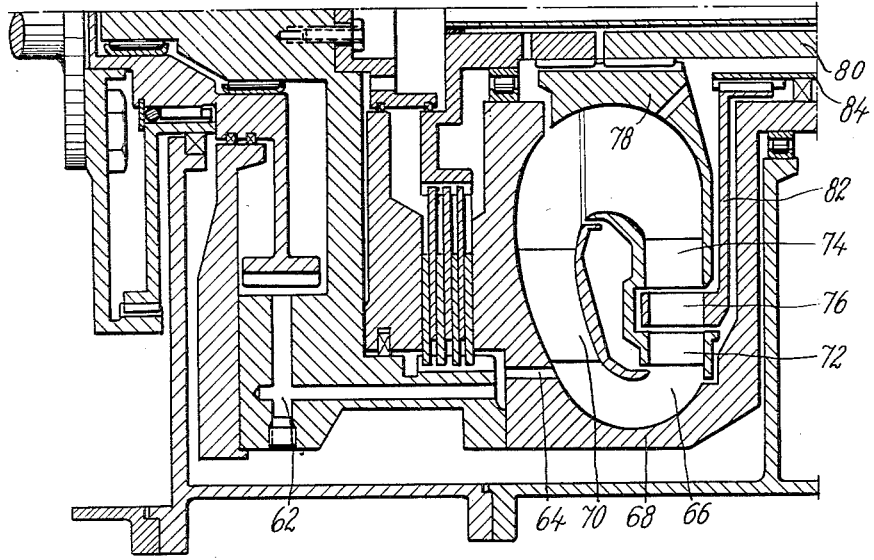
Fig. 2 shows another section through the same embodiment of the transmission along the line 2—2 in Fig. 3.

The shaft 10 driven by an engine is rotationally rigidly connected to the primary shaft 14 by means of a disc 12 which allows some axial displacement and some non-coaxiality. A gear 16 is rigidly connected to the primary shaft. This gear is arranged inside a housing 18 filled with fluid, the one end wall 20 of which is designed with a journal 22, on which the shaft 14 is journalled and the other end wall 24 of which seals against the shaft 14.

In the housing 18 a number of recesses 26 are arranged radially outside the gear 16. In each one of these two gears 28, 30 are rotationally journalled by means of needle bearings 32 on their shafts 36, 38 located in the housing. One of these gears, viz. gear 28, engages gear 16, this latter gear serving as a sun gear, the other gears as planetary gears and the housing as a planetary gear carrier.

The two gears 28, 30 located in a recess 26 are of equal dimension and arranged at differently dimensioned radial distances from the transmission shaft which difference is of the same size as the depth of the gear teeth. These gears rotate in the direction of arrows 40, 42 and serve as a gear pump supplying fluid from the central chamber 44 of the housing 18 to a pressure chamber 46 of great peripheral extension arranged radially outside the pump. On both sides of the pump sealing plates 48, 50 are arranged, which are axially pressed-in against the gears 28, 30 by conducting pressure fluid through a channel 52 from the pressure chamber 46 to that side of respective sealing plates 48, 50 that is turned away from the pump.

Between the pressure chamber 46 and the central chamber 44 a circulation duct 54 is arranged provided with a valve consisting of a radially adjustable valve seat 56, a valve body 58 and a spring 60, pressing the valve body radially outwards to contact the valve seat.

The central chamber 44 is further by means of pipe lines 62, 64 in open communication with the working chamber 66 of a hydrodynamic torque converter. Through this communication is obtained that the housing 18 is always maintained filled with fluid since fluid is supplied continuously to the torque converter from a tank by means of a separate pump.

The torque converter is of a type previously known per se. A rotating housing 68 is rigidly connected with the housing 18. In this housing 68 a pump blade ring 70 is rigidly arranged. In addition two turbine blade rings 72, 74 are arranged in the torque converter and one reaction blade ring 76 is located therebetween.

The turbine blade rings 72, 74 are arranged on a turbine disc 78, which is rotationally rigidly connected to a turbine shaft 80 which may constitute the propeller shaft of the transmission also. The reaction blade ring is in a similar manner rotationally rigidly connected to a reaction shaft 84 by means of a reaction disc 82. This shaft is actuated by a counter-directed torque, either thereby that it is maintained stationary or thereby that it is connected to the turbine shaft 80 by means of a gearing and thus with necessity will rotate with a speed that is dependent of the turbine shaft speed.

The housing 18 is provided with a bell-shaped recess at its side facing the torque converter. In this recess is arranged a direct clutch designed as a hydraulically operated disc clutch. A hydraulic piston 86 is displaced in this recess by means of pressure fluid supplied through a duct 88 in the turbine shaft 80 and ducts 90 in a centre trunnion 92. This piston 86 is arranged to compress a number of clutch discs 94, 96 and to press them against a press surface 98 arranged on the rotating housing of the torque converter. The clutch discs 94, 96 consist of two different sets, one of which is rotationally stationary with the housing 18 and the other is rotationally stationary with a hub 100 which in turn is rotationally stationary arranged on the turbine shaft 80. The direct clutch is disengaged by removing the compression pressure, whereby the pressure of the fluid in the working chamber 66 of the torque converter existing on the opposite side of the piston releases the clutch.

In the operation of the transmission the shafts 10 and 80 may be connected with the power shaft and with the driven shaft of a motor vehicle or other machine respectively. When the power shaft begins to rotate it also imposes a rotation on the central gear wheel 16 of the hydrostatic coupling. As this gear wheel intermeshes with one gear wheel 28 of each gear pump 29, 30 also the gear pumps begin to rotate. Owing to the fact that the valves 56, 58, 60 in the circulation ducts 54 between the pressure chambers 46 and the central chamber 44 are closed, the rotation of the gears 28, 30 of the gear pumps will cause a pressure to be built up in each pressure chamber 46 of the coupling. This pressure will cause a resistance against the rotation of the pump gears 28, 30. Owing to this resistance there will be a torque trying to rotate the housing 18 of the coupling.

When the torque for rotation of the housing 18 has increased up to a value corresponding to the resistance from the driven shaft against rotation of the housing 18, this will begin to rotate in the same direction as the central gear 16. The pressure in the pressure chambers 46 increases up to a value corresponding to the torque delivered from the power shaft and when this value is reached the gears 28, 30 stop rotating, excepting for the rotation necessary to compensate for the leakage losses. With the gears 28, 30 rotating only to compensate for the leakage losses, the housing 18 rotates in the same direction and at almost the same speed as the central gear 16.

Depending on whether a torque multiplication between the power shaft 10 and the driven shaft 80 is required or not, the torque converter or the direct clutch will be engaged for transmitting the power from the housing 18 of the hydrostatic coupling to the driven shaft 80. The converter per set as well as the direct clutch per se and the means for shifting therebetween are previously known and do not form any part of the present invention.

However, it is of the utmost importance that the power is transmitted from the power shaft 10 to the torque converter as well as to the direct clutch by the hydrostatic coupling 16, 28, 20, as this coupling will protect the transmission against overload and also dampen the vibrations arising from the power shaft 10 or from the driven shaft 80. These characteristics of the coupling will be clear fom the following detailed statement.

If the torque delivered from the power shaft increases up to and above a value depending on the pressure of the valve springs 69 and the centrifugal forces acting upon the valve body 58, the valves will open and the fluid will circulate from the pressure chambers 46 via the ducts 54 to the central chamber 44. When the pressure decreases in the pressure chambers 46, the gear pumps 28, 30 will also begin to rotate so that there will be a difference in the speed of the central gear 16 and the housing 18, i.e., the coupling is slipping. When the torque once more decreases beneath said value the valves 56, 60 again shut, the gear pumps 28, 30 stop rotating and the coupling stops slipping.

When the torque of the power shaft decreases, the pressure in the pressure chambers 46 is at the first moment the same but decreases through leakage down to a new value. During this time, the gear pumps 28, 30 do not rotate at all and the decrease in the speed of the central gear 16 does not immediately decrease the speed of the housing 18. During a deceleration period the driven shaft for this reason has the same speed as the power shaft and comes to a stop at just the same time. The pressure in the pressure chambers 46 decreases then down to the same pressure as in the central chamber 44 so that upon a new start exactly the same operation is repeated.

In this way, the coupling is engaged gently, the transmission is protected against overload and vibrations of the device are dampened.

Owing to the location of two pump gears 28, 30 of the same or almost the same size on the same or almost the same radial distance from the axis of the coupling, both the gears 28, 30 are acted upon by centrifugal forces of almost the same size so that there will be no leakage between the gears on this account. As the pressure chamber 46 of each pump further is located radially outside the gears 28, 30 and has a peripheral length greater than the arc corresponding to the angle between the axes of the pump gears 28, 30 in relation to the axis of the coupling, the pressure in this pressure chamber 46 will act on the pump gears 28, 30 in a direction approximately contra to the direction of the centrifugal forces. Said pressure will for this reason counteract the centrifugal forces so that there will be no leakage between the gears 28, 30 and the walls of the recess 26.

A coupling embodying the invention is for these reasons capable of being used at much higher numbers of revolutions of the coupling than earlier known types of hydrostatic couplings.

More than one separate driving unit, each comprising a separate engine and a separate transmission of the present type, may be installed in one and the same vehicle. Owing to the fact that such a transmission will slip at overload, the load of the driving units will be distributed to all the driving units at hydraulic drive as well as at direct drive.

The present transmission is for this reason especially suitable for multi-engine installations in vehicles such as rail vehicles.

Figure 3:
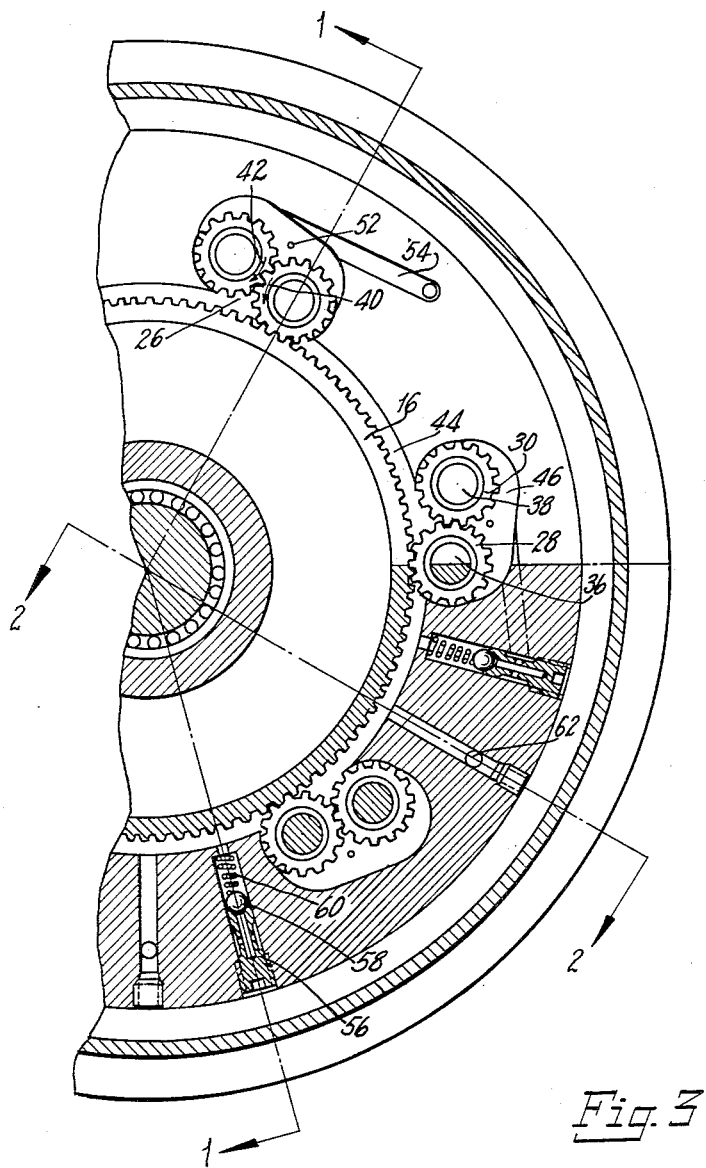
Fig. 3 shows a cross-section through the same embodiment of the transmission along the line 3—3 of Fig. 1.
Figure 5:
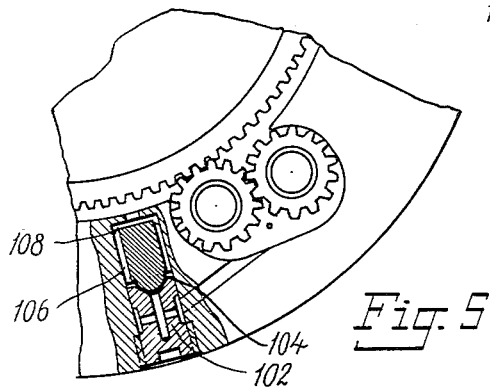
Fig. 5 shows an alternative embodiment of a detail in Fig. 3.

Fig. 5 shows an alternative embodiment of the maximum torque valve, displayed in the same view as in Fig. 3. The valve consists in this case of a seat 102 and a valve body 104 sealing outwards, which has a relatively large mass and is provided with lands 106 to be guided in the duct 108. The valve is not provided with any spring.

Figure 7:
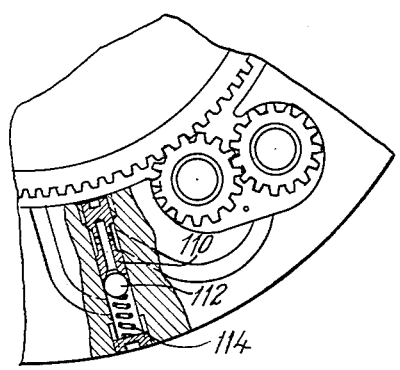
Fig. 7 shows a second alternative embodiment of the same detail as in Fig. 5.

Fig. 7 shows another alternative embodiment of the maximum torque valve displayed in the same view as in Fig. 3. In this case the valve consists of a seat 110 and a valve body 112 sealing inwards, which is forced against its seat by means of a spring 114.

Figure 9:
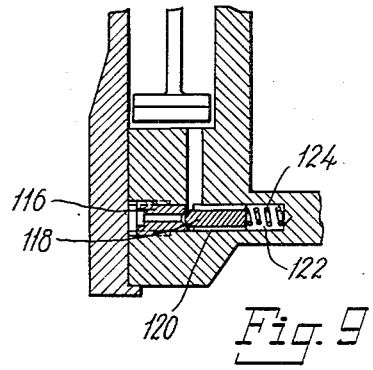
Fig. 9 shows an alternative embodiment of a detail in Fig. 1.

Fig. 9 shows a third alternative embodiment of the maximum torque valve displayed in the same view as in Fig. 1. In this case the valve consists of a seat 116 and a valve body 118 displaceable parallel with the shaft and sealing against the seat, said body being guided by means of lands 120 in recesses 122 and pressed against the seat by means of a spring 124.

Figs. 4, 6, 8 and 10 show how the maximum transmittable torque is varying with the speed when different types of valves are used.

Figure 4:
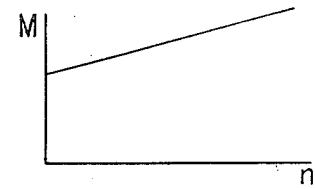
Fig. 4 is a diagram showing the relation of the maximum torque to the speed in the embodiment according to Fig. 1.

Fig. 4 is the characteristic of a valve according to the embodiment in Figs. 1 and 3, in which the spring force and the centrifugal force co-operate, which provides a certain starting torque and a torque perpetually increasing with the speed.

Figure 6:
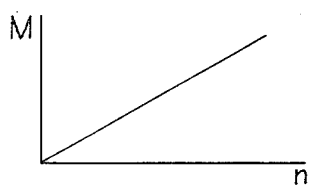
Fig. 6 is a diagram showing the relation of the maximum torque to the speed in the embodiment according to Fig. 5.

Fig. 6 is the characteristic of a valve according to the embodiment in Fig. 5, in which the valve body is actuated by the centrifugal force only, giving a starting torque which is very near zero but a torque perpetually increasing with the speed.

Figure 8:
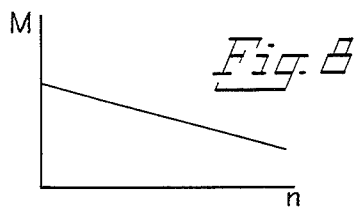
Fig. 8 is a diagram showing the relation of the maximum torque to the speed in the embodiment according to Fig. 7.

Fig. 8 is the characteristic of a valve according to the embodiment in Fig. 7, in which the spring force and the centrifugal force counteract each other, which provides a high starting torque and a torque perpetually decreasing with the speed.

Figure 10:
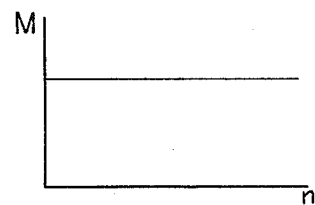
Fig. 10 is a diagram showing the relation of the maximum torque to the speed in the embodiment according to Fig. 9.

Fig. 10 is the characteristic of a valve according to the embodiment in Fig. 9, in which the influence of the centrifugal force is eliminated, which provides a constant torque irrespective of the speed.

Figure 11:
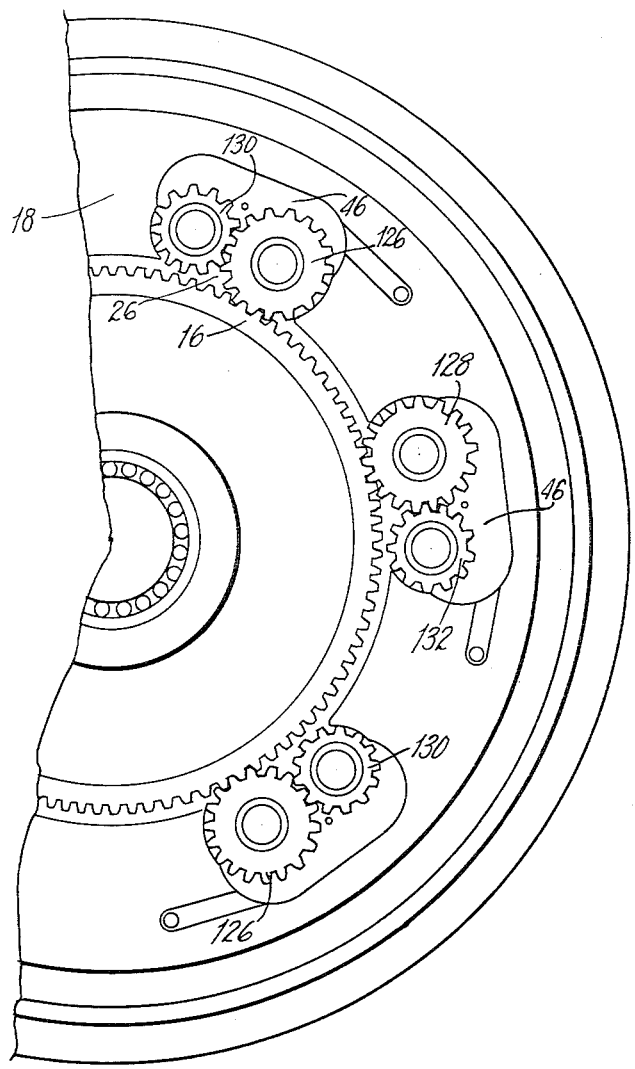
Fig. 11 shows a cross-section through a further embodiment of the invention.

Fig. 11 shows an alternative embodiment of the invention, where the gear 16 is arranged inside the housing 18 filled with fluid. In the housing 18 a number of recesses 26 are arranged radially outside the gear 16. In each one of said recesses a gear 126 and 128 respectively is rotationally mounted, which cooperates with the gear 16 and with a second gear 130 and 132 respectively.

The two pump gears 126, 130 and 128, 132, respectively, located in a recess 26 are arranged at the same radial distance from the transmission shaft. The freewheeling gear 130, 132, respectively, has a radius which is approximately one tooth depth smaller than the radius of the gear 126, 128, respectively, co-operating with the gear 16.

The gears 130 and 132 are further located on different sides of their co-operative gear 126 and 128, respectively, whereby the one gear pump 126, 130 will supply fluid to its pressure chamber 46 at one relative direction of rotation between the gear 16 and the housing 18, whereas the other gear pump 128, 132 will supply fluid to its pressure chamber 46 at an opposite relative direction of rotation between the gear 16 and the housing 18. In this way the coupling is utilizable for drive in both directions, which is of particular advantage in vehicle drive, since it provides the possibility of using the engine for braking.

Figure 12:
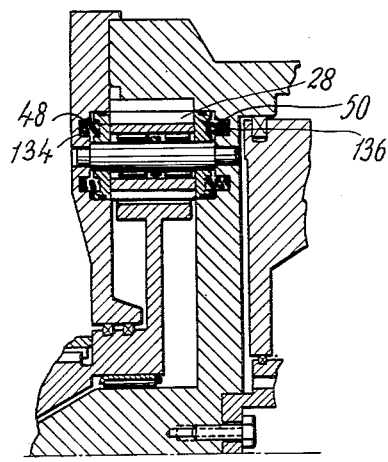
Fig. 12 shows an alternative embodiment of still another detail in Fig. 1.

Fig. 12 shows an embodiment, in which the axial sealing plates 48, 50 are pressed against the gears 28, 30 by means of springs 134, 136 instead of by pressure oil.

The invention is not restricted to what has been shown in the embodiments described above. Thus other combinations may exist also, for example equally dimensioned pump gears at different radial distances from the transmission shaft at a coupling in which different pumps operate in different directions, as well as differently dimensioned pump gears at equal radial distances from the transmission shaft at a coupling in which all the pumps operate in the same direction.

What I claim is:

1. Hydraulic transmission comprising a first shaft, a hydrostatic coupling with a fluid filled casing, having a primary member adapted for connection with said first shaft and a secondary member, a hydrodynamic torque converter having a casing enclosing a closed hydraulic circuit including an impeller adapted for connection with said secondary member of said hydrostatic coupling, a turbine member adapted for connection with a second shaft and a bladed reactor member, and a mechanical direct clutch having a first member adapted for connection with said secondary member of said hydrostatic coupling, a second member adapted for connection with said second shaft and means for selectively interconnecting said first and second members.

2. Hydraulic transmission according to claim 1 in which a central gear wheel nonrotatably mounted on said first shaft constitutes said primary member of the hydrostatic coupling and said fluid filled casing of the hydrostatic coupling has a central chamber enclosing said central gear wheel and constitutes said secondary member of the coupling, said casing having recesses located in the wall of the central chamber, each recess enclosing two intermeshing planetary gear wheels peripherally located side by side and rotationally journalled in the casing, one of said two planetary gear wheels intermeshing with said central gear wheel, each recess being open to said central chamber and having walls sealing against the gear wheels enclosed therein, and further having a portion radially outside the gears in fluid communication with said central chamber through a circulating duct, and a valve arranged in each circulating duct.

3. Hydraulic transmission according to claim 2 in which each pair of intermeshing planetary gear wheels is provided with sealing plates arranged axially to the planetary gear wheels.

4. Hydraulic transmission according to claim 3 in which the sides of the sealing plates turned away from said planetary gear wheels are in fluid communication with said portion of the recess outside the planetary gears.

5. Hydraulic transmission according to claim 3 in which the sealing plates are influenced by pressure springs on the sides turned away from said planetary gear wheels.

6. Hydraulic transmission according to claim 2, in which the casing of the coupling is rigidly connected to said impeller of the converter and said first member of the direct clutch.

7. Hydraulic transmission according to claim 2, in which the two gears of each pair of planetary gears are equally dimensioned and arranged at different radial distances from the transmission shaft, the difference in radius being of about the same size as the tooth depth of the gears.

8. Hydraulic transmission according to claim 2, in which the two gears of each pair of planetary gears have a difference in radius being of about the same size as the tooth depth of the gears aand arranged at the same radial distance from the transmission shaft.

9. Hydraulic transmission according to claim 2, in which said portion of each recess radially outside the gear wheels enclosed therein has a peripheral length greater than the arc corresponding to the angle between the axes of said gear wheels in relation to the axis of the coupling.

10. Hydraulic transmission according to claim 2, in which the planetary gear wheels intermeshing with said central gear wheel are located on different peripheral sides of the corresponding planetary gear wheels in the recesses in order to transmit torque in either direction through the transmission.

11. Hydraulic transmission according to claim 2 in which said planetary gear wheels are rotationally mounted on their shafts.

12. Hydraulic transmission according to claim 11, having means for fluid communication between said casing of the coupling and said casing of the converter.

13. Hydraulic transmission according to claim 2, in in which said valves are of the non-return valve type for fluid flow from said radially outer portion of each recess to said central chamber and each valve comprises a valve body and a valve seat.

14. Hydraulic transmission according to claim 13, in which the valve body is arranged to move radially outwardly for sealing against its seat.

15. Hydraulic transmission according to claim 13, in which said valves are actuated by a spring.

16. Hydraulic transmission according to claim 15, in which each spring is individually adjustable.

17. Hydraulic transmission according to claim 15, in which the valve body is arranged to move radially outwards for sealing against its seat.

18. Hydraulic transmission according to claim 15, in which the valve body is arranged to move radially inwards for sealing against its seat.

19. Hydraulic transmission according to claim 15, in which the valve body is arranged to move parallel with the axis of the transmission for sealing against its seat.

References Cited in the file of this patent

UNITED STATES PATENTS

| | | |
|---|---|---|
| 1,752,385 | Johnson | Apr. 1, 1930 |
| 1,978,680 | McDonald | Oct. 30, 1934 |
| 2,771,972 | Thurber | Nov. 27, 1956 |